United States Patent [19]

Singer et al.

[11] Patent Number: 5,337,631
[45] Date of Patent: Aug. 16, 1994

[54] METHOD OF PRODUCING TOOLS AND DIES

[75] Inventors: Alfred R. E. Singer, Swansea, Wales; Joseph McGeough, Edinburgh, Scotland; Allen D. Roche, Aberdare, Wales

[73] Assignee: British Technology Group Limited, London, England

[21] Appl. No.: 965,283

[22] PCT Filed: Jul. 30, 1991

[86] PCT No.: PCT/GB91/01288

§ 371 Date: Mar. 31, 1993

§ 102(e) Date: Mar. 31, 1993

[87] PCT Pub. No.: WO92/02657

PCT Pub. Date: Feb. 20, 1992

[30] Foreign Application Priority Data

Aug. 2, 1990 [GB] United Kingdom ................. 9016985

[51] Int. Cl.5 .......................... B21K 5/20; C23C 4/08; C23C 4/18
[52] U.S. Cl. ..................... 76/107.1; 164/19; 164/46

[58] Field of Search ............. 76/101.1, 107.1, DIG. 6; 164/19, 46, 76.1; 29/527.5, 527.1; 264/225; 427/421, 427

[56] References Cited

U.S. PATENT DOCUMENTS 2,258,452 10/1941 Ingham et al. .
2,281,634 5/1942 Stoessel .
3,826,301 7/1974 Brooks .

OTHER PUBLICATIONS

Patent Abstracts of Japan, vol. 13, No. 111, Nov. 1988, JP 63-286563.
Patent Abstracts of Japan, vol. 4, No. 60, Feb. 1980, JP 55-027245.

Primary Examiner—Roscoe V. Parker
Attorney, Agent, or Firm—Cushman, Darby & Cushman

[57] ABSTRACT

Tools and dies are made from a master pattern by making a hard chromium electroformed shell from the pattern, supporting the pattern and filling it with tool steel which applied by spray deposition of molten particles, the deposit being continuously densified by peening as it is made.

12 Claims, 2 Drawing Sheets

METHOD OF PRODUCING TOOLS AND DIES

This invention relates to a method of producing tools and dies.

Tools and dies for use in the plastics industry are frequently made by a replication technique from a master pattern. Such techniques typically involve spraying low-melting metals such as zinc onto the pattern followed by releasing the solidified metal from the pattern and subsequent use. Such negative replicas are very succesful and are able to replicate fine detail.

Meanwhile, work on spray forming of metal has established that dense massive artefacts in high-temperature metals including die steels can be manufactured by a spray forming technique using atomised liquid metal. The advantages (as with low-temperature metals) are fine grain size, absence of macro segregation, good mechanical properties and low cost per kg of deposit. Unfortunately this technique cannot be applied directly to making tool steel dies by replication because high internal stress during deposition and subsequent cooling of high-temperature metals cause marked distortion. Such distortion invalidates this process as a possible contender for making dies that have to withstand very high pressures during the pressing and forging of metals.

A further development of spray forming is simultaneous spray peening, described in GB Patent No. 1605035, and used for making dense ductile products. The disclosure of GB 1605035 is incorporated herein by reference. Simultaneous spray peening as there described achieves controlled internal stress in the products while preserving the other benefits of spray forming. In more detail, the spray deposit is continuously densified as it builds up by the mechanical work which is imparted from the peening at high temperature to the deposit, and the tensile thermal stresses, which normally lead to distortion of spray formed deposits more especially at higher temperatures, can be neutralised by the compressive stresses induced by the peening action. By adjusting the kinetic energy of the incident peening shot, internal stresses can be controlled so as to eliminate distortion of high temperature deposits (e.g. tool steel or Stellite), in theory enabling reliable replication in even these metals.

However, tn practice, various difficulties remain in some cases. Thus, at the commencement of deposition during simultaneous spray peening, the peening balls hit the pattern surface or the first few splats of metal deposited on the pattern. If the pattern is of a soft material such as wood, plaster or a polymer, the impact of the peening balls may shatter or indent the pattern. In the case of plastics and wood, the high temperature splats of tool steel impacting the surface may also decompose or char the pattern surface, which may render it unusable for repeated use. Metal or refractory patterns are less likely to suffer from this problem but are inherently more expensive to make. A further difficulty occasionally met is that if the first few splats are solidified very rapidly, the first 50 μm of the negative replica surface may be slightly porous, making the surface of the die slightly softer than the rest of the deposit. This undesirable effect is particularly evident with metal patterns, which have high thermal conductivity.

Another well-known technique of replication of a pattern is electroforming. This technique is so good at copying fine detail that it is used for making phonographic record masters. In electroforming, the pattern surface is copied by electroplating. Thus, the pattern surface, if not already electrically conductive, must be made so by (for example) spraying or painting it with a volatile suspension of colloidal graphite or sputtering it with gold. The pattern surface is made the cathode in a solution of a salt of an electroplatable metal.

An electrodeposit of the metal thereupon gradually forms on the pattern (cathode) and builds up to produce an electroformed shell or "electroform". The process is continued until the electroform has reached its desired thickness, when it is detached from the pattern, whose surface derail it will have replicated very accurately.

Unfortunately electroforming has limited use for the manufacture of tools and dies: it is slow and relatively expensive per kg of deposit when thick deposits have to be made; only a limited range of alloy compositions can be electrolytically deposited, not including tool steels; and thick electrodeposits suffer from internal stresses which cause unacceptable distortions to the electroformed tool or die. Some tools and dies are made by producing a thin (undistorted) electroformed shell which is then backed with a polymerising resin, a plasticised cement or by casting a metal into the electroformed shell. The first two have the disadvantage of being unsuited for the high stresses or temperatures to which tools and dies are often subjected and the third in practical cases suffers from shrinkage during solidification.

Thus, not only are electroforming and spray deposition both inadequate for producing tools and dies, but they also have characteristics which would be considered mutually competitive and incompatible.

According to the present invention, a method of producing a tool or die from a pattern comprises making an electroform from the pattern and filling the electroform to make the tool or die, characterised in that the electroform is filled by spraying, onto it, molten atomised metal which is hot worked or densified while it is being deposited, preferably by peening.

It was unexpected that two inadequate, competitive and apparently incompatible techniques could be combined, and the method according to the invention surprisingly enables all the advantages of electroforming, i.e. accuracy of detail and fine working-surface finish, to be combined with all the benefits of simultaneous spray peening, which gives freedom to use any alloy (especially a high-temperature tool steel), at a low cost per kg with the advantages of a hot worked deposit of high density with controlled internal stress. It is particularly surprising that detrimental elements of each individual process are eliminated by using this combination of processes. Thus the cost and internal stress of electroforming are minimized by using only a thin shell, and the shortcomings of simultaneous spray peening (of a slightly porous first layer of splats when spray formed on a metal base) is overcome by the electroformed shell binding the spray deposit together if it is made of a hard facing material such as hard chrome plating. Similarly the peening action on the pattern is greatly reduced by the electroformed shell enabling a wide variety of pattern materials to be used, such as plastic, plaster or refractories.

The electroform may be filled from either side depending on whether a positive or negative copy is wanted and on the accuracy required, i.e. it may be filled from the side that faced the pattern if a certain loss of definition can be accepted, or otherwise and more preferably, from the surface distant from the pattern. The filling may be the same material as or different material from the electroform, which in these respective cases may for example be of nickel or of chromium.

The pattern may be, for example, of plastic, wood or plaster pattern. The electroform may be a thin shell of a hard facing metal such as chromium to a thickness of, for example, 0.1 mm or 0.25 mm to 1.0 mm. The shell upon reaching the desired thickness is then normally detached from the master pattern. A copy of the master pattern may then be made using a rubber mould intermediate negative which is then filled with a castable refractory. The castable refractory is dried and fired to produce a positive copy of the master pattern. Alternatively, a castable refractory can be cast directly onto the electroform, dried, separated and fired, to make the positive copy. If a master plastic pattern is used it may, with advantage, be made direct from the drawing board using stereolithography.

The electroformed shell may be placed on the positive copy for support, and a thick deposit of, for example, tool steel is laid down on the inside of the shell by simultaneous spray peening, preferably ensuring that the peening rate and speed are such that no distortion of the shell occurs. In this respect it will be found that increasing the peening ball speed or intensity will raise compressive stresses and vice versa. Generally speaking compressive stresses will tend to cause distortion which is convex to the peening source and vice versa. Controlling the peening speed and/or intensity is easily achieved by varying the speed of the mechanical slinger used for peening or by regulating the quantity of peening balls into the slinger respectively.

The spraying and peening can be continued until the deposit is sufficiently thick to be machined to fit into a tool or die holder or if required the deposit if of tool steel can be stopped at for example 10 mm thickness and a spray deposit of a cheaper steel can be continued using spray deposition with or without simultaneous peening. Alternatively the tool or die can be backed with cast iron or even a plasticised cement because the spray-peened deposit by this time will be very rigid and strong. In some cases a metal matrix composite may be found more appropriate for the tool or backing because of its lower thermal expansion.

It is, of course, possible to leave the electroform on the pattern from which it is made and then to fill the electroform by spray-peening while it is still on the pattern. In this case there may be a risk that the higher temperature (from the spray) may damage the pattern although this would not be important if only one or a few tools or dies are needed from it.

Another way of carrying out the method according to the invention is to use a hard pattern, which may be made as indicated above (e.g. cast from a refractory material and fired) by using a rubber mould or other mould as an intermediary. An electroform is made on the pattern and tool steel is deposited on the back of the electroform while the latter is still on the refractory pattern. Three advantages follow from this procedure. Firstly, the same pattern may be used many times. Secondly, the electroform may be very thin (speed and cheapness) as it does not have to be detached from the pattern before being reinforced by tool steel. Thirdly, as a consequence of that thinness, the disadvantageous chilling effect of any electroform on the first layers of spray deposit is greatly reduced leading to a high surface density and hardness.

It will be found preferable to ensure that the outer working face of the electroformed shell is smooth to accurately replicate the master pattern. At the same time it is preferable to have a rough inner surface to ensure good adhesion of the SSP deposit to the shell. This is readily achieved by control of the electrodeposition variables.

The invention will now be described by way of example with reference to the accompanying drawings, in which two examples are depicted in FIGS. 1–3 and 4–6 respectively.

EXAMPLE I

Figure 1:
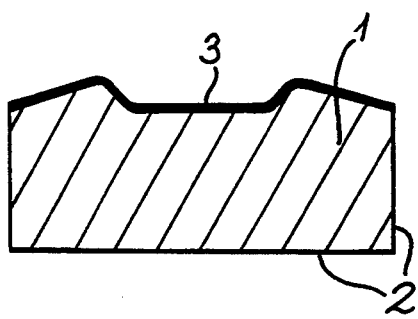
FIG. 1 is a vertical section through a master pattern and an electroform made on it.
Figure 2:
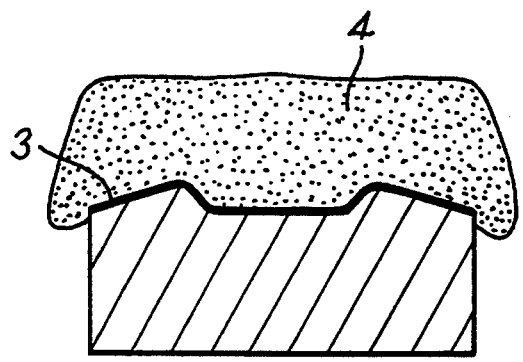
FIG. 2 shows the electroform still on the pattern and filled with tool steel.
Figure 3:
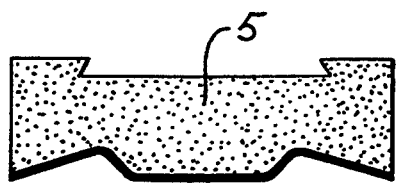
FIG. 3 shows the filling trimmed and machined to the form required for a die holder.

A thin film of colloidal graphite is sprayed on to a plastic or high alumina refractory master pattern 1 which is 75 mm diameter having a symmetrical corrugated form. The edges and back 2 of the pattern 1 are stopped-off with a stopping-off paint to prevent electrodeposition at these points. Chromium is deposited electrolytically on the graphite film, constituting an electroform 3 which is 0.25 mm thickness and conditions are arranged such that the back of the deposit is left with a rough surface to give good adhesion to a subsequent spray deposit. Tool steel (molten particles) is sprayed on to the rough back of the deposit using a wire-fed arc spray gun, with simultaneous peening, to form a filling 4. The peened spray deposit is adherent to the rough back surface of the electroform 3 but invariably is not of the precise external shape required. The deposit 3+4 is detached from the pattern 1, and machined or ground to the form 5 required by a die holder, as shown in FIG. 3.

EXAMPLE II

Figure 4:
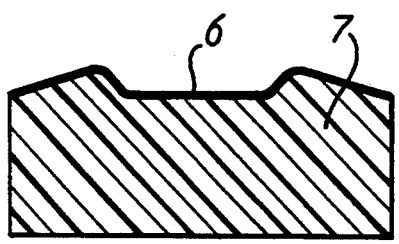
FIG. 4 shows a thin deposit of chromium on a plastic master pattern made by using the technique of stereolithography.
Figure 5:
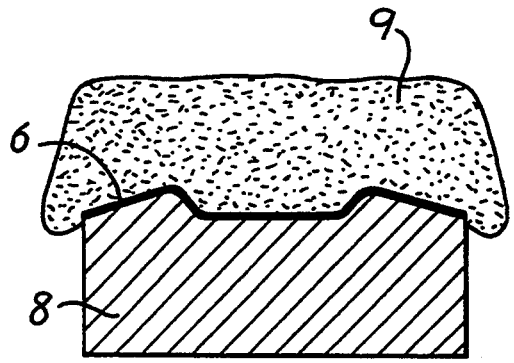
FIG. 5 shows the electroformed shell, placed on a castable refractory copy of the master pattern made via a "rubber" mould, on to which an SSP deposit of tool steel has been sprayed.
Figure 6:
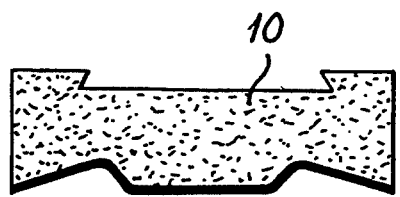
FIG. 6 shows the shell attached to the SSP deposit after machining to fit into a die holder.

Many dies are required using the same master pattern, which is made from plastic using stereolithography. In this case any possible damage to the master pattern must be avoided and a slightly different technique is used from Example I. An electroformed shell of chromium ½mm thick 6 is made on the master pattern 7 FIG. 4 as in Example I, the only difference being that the pattern 7 is of plastic. The shell 6 is then removed and fitted on to a refractory positive replica 8 FIG. 5. This replica 8 was made from a castable refractory via a rubber negative (itself taken from the master pattern 7); the replica 8 was dried and fired. During those procedures, the replica 8 possibly lost some of the very fine detail of the master pattern 7 but serves as an adequate base for the electroformed shell. Tool steel 9 is then sprayed on to the back of the electroformed shell 6 resting on the replica 8 as before. Subsequently the tool steel 9 and the attached shell 6 are removed from the refractory base (=replica 8) and machined or ground to the required profile 10 to fit the die holder.

In both Examples a tool steel die will be produced faced with hard chromium. Electroformed shells of other compositions can be generated if required, examples being N1, Fe and Ni/Cr. Similarly any hard backing metal or alloy can be applied using simultaneous spray peening techniques as described in GB 1605035. Such metals and alloys could include carbon steels, alloy steels and Stellite. In both Examples, the important point is that the filling of the electroform is made by spray deposition of molten particles, the deposit being continuously hot-worked, viz densified, by peening as it is made.

We claim:

1. A method of producing a tool or die from a pattern, comprising making an electroform from the pattern and filling the electroform to make the tool or die, characterised in that the electroform is filled by spraying, onto it, molten atomised metal which is hot worked or densified while it is being deposited.

2. A method according to claim 1, wherein the electroform is filled from the side that faced the pattern.

3. A method according to claim 1, wherein the electroform is filled from the surface distant from the pattern.

4. A method according to claim 3, wherein the electroform is filled while still on the pattern.

5. A method according to claim 1, wherein the electroform is placed on a copy of the pattern to support it during the peening.

6. A method according to claim 5, wherein the copy of the pattern is of a refractory.

7. A method according to claim 1, wherein the electroform is of one of nickel and chromium.

8. A method according to claim 1, wherein the electroform is 0.1 to 1.0 mm thick.

9. A method according to claim 1, wherein the pattern is of one of wood, plaster and a polymer.

10. A method according to claim 1, wherein the pattern is of one of a metal and refractory.

11. A method according to claim 1, wherein the hot working or densifying of the metal sprayed onto the electroform is achieved by peening.

12. A tool or die made by the method of claim 1.

* * * * *